United States Patent [19] | [11] 4,361,885
Ehricke | [45] Nov. 30, 1982

[54] SYSTEM FOR CHANNEL-SPECIFIC RELEASING AND BLOCKING OF TELEPHONE CHANNELS IN CONVERTERS OF A TIME DIVISION MULTIPLEX SYSTEM FOR PULSE CODE MODULATION

[75] Inventor: Claus Ehricke, Munich, Fed. Rep. of Germany

[73] Assignee: Siemens Aktiengesellschaft, Berlin & Munich, Fed. Rep. of Germany

[21] Appl. No.: 229,310

[22] Filed: Jan. 29, 1981

[30] Foreign Application Priority Data

Feb. 28, 1980 [DE] Fed. Rep. of Germany ....... 3007586

[51] Int. Cl.³ ........................ H04J 3/04

[52] U.S. Cl. ........................ 370/13

[58] Field of Search ........................ 370/13, 17, 16, 58; 179/18 EE, 175.2 C, 175.3 S

[56] References Cited

U.S. PATENT DOCUMENTS 4,152,543 5/1979 Prudhon et al. ........................ 370/13
4,302,839 11/1981 Mueller et al. ........................ 370/13

OTHER PUBLICATIONS

"Time-Division Multiplex Systems PCM-30 and PCM-120", Siemens AG, pp. 1-7 plus stock number sheet.

Telcom Report 2 (1979), pp. 65-71, Beiheft >> Digital-Übertragungstechnik <<.

Zeitschrift 49 (1975), pp. 466-472, Siemens, Heft 7.

*Primary Examiner*—Thomas A. Robinson
*Attorney, Agent, or Firm*—Hill, Van Santen, Steadman, Chiara & Simpson

[57] ABSTRACT

The present invention relates to a system for channel-specific releasing and blocking of telephone channels in "outgoing" signaling converters and in "incoming" signaling converters of a pulse code modulation (PCM) system. Alarm signals which influence the signaling converters are generated in monitoring devices. The first alarm signal serves for accommodating the signal transmission and occurs immediately given faults in the system and occurs delayed given disturbances in the system. The second alarm signal effects a blockage of the telephone channels with respect to new seizure and is immediately triggered given disturbances in the system and given faults in the system. Given this method of alarm, a channel-specific and time-differentiated release and blocking of telephone channels occurs independently of the presence of a central processing device in a signaling converter equipment.

2 Claims, 2 Drawing Figures

5
6
7
8
KZUK
K3
K4
EK
03
04
SK
B
-5V
-5V
Al2
Al1
12
11
MUX2
T2
MUX4
Üw2
L1
L2
MUX1
T1
MUX3
Üw1
10
9
Al2
Al1
-5V
-5V
EG
A
SG
01
02
K1
K2
KZUG
1
2
3
4

SYSTEM FOR CHANNEL-SPECIFIC RELEASING AND BLOCKING OF TELEPHONE CHANNELS IN CONVERTERS OF A TIME DIVISION MULTIPLEX SYSTEM FOR PULSE CODE MODULATION

BACKGROUND OF THE INVENTION

1. Field of the Invention

This invention relates to a system for releasing and blocking telephone channels in signaling converters of a time division multiplex (TDM) system for pulse code modulation (PCM) in a terminal having at least one channel-specific "outgoing" or "incoming" signaling converter and a monitoring device with an alarm signal occurring simultaneously with faults and time-differentiated given disturbances.

2. Description of the Prior Art

Signaling converters are described in the publication "Siemens-Zeitschrift", 49 (1975) 7, pp. 466–472 and in the publication "Telcom-Report", 2 (1979), insert "Digital-Übertragungstechnik" pp. 65–71.

A signaling converter equipment, is divided into central and peripheral portions. The channel-specific "outgoing" and "incoming" signaling converters are counted amongst the latter, the signaling converters being equipped with corresponding circuits for receiving and transmitting signals for the exchange. Among other things, the central devices contain monitoring circuits which allow internal device faults or disturbances of the incoming signals to be perceived. A response of specific monitoring functions, thereby, should lead to immediate or delayed release of seized channels as well as to the immediate blocking of unseized channels. The delayed release, for example, should bridge brief failures of the frame synchronism. Moreover, in such cases, signaling should likewise not be immediately interrupted. In those central portions in which the signals are merely time-division multiplexed, no evaluation of the signal contents is provided. In general, the signals here can only be set immediately or delayed to a specific binary value, for example the value "1". The effect on the blocking and releasing of connections, therefore, can only occur without differentiation either directly or delayed.

SUMMARY OF THE INVENTION

The object of the present invention is to provide a channel-specific, time-differentiated releasing and blocking of telephone channels, independently of the existence of a central processing portion.

Proceeding from a system of the type initially mentioned above, the above object is achieved according to the present invention given a terminal with "outgoing" signaling converters in that, in a monitoring device, a first signal output for a first alarm signal is connected to the setting input of a flip-flop for the begin and end of conversation characters and to the setting inputs of potential further flip-flops in the receiving portion of the "outgoing" signaling converter and to a respective input of a NOR gate at least for seizure/release and dialing in the transmit portion of the "outgoing" signaling converter and a second signal output for a second alarm signal is connected to the setting input of a flip-flop for idle/block in the receiving portion of the "outgoing" signaling converter. Given a terminal with "incoming" signaling converters, the above object is achieved in that for the first alarm signal they are connected to an input of a NOR gate for begin and end of conversation characters and to a respective input of potentially further NOR gates in the transmission portion of the "incoming" signaling converter and to the setting input of at least the flip-flop for seizure/release and the flip-flop for dialing in the receiving portion of the "incoming" signaling converter, and in that for the second alarm signal they are connected to an input of a NOR gate for idle/block in the transmitting portion of the "incoming" signaling converter.

Facilitating the above solution are that the individual circuit complexes for blocking and releasing in the peripheral signaling converters are already arranged separately, so that in the alarm case for the chronologically-differentiated interference occurs very easily.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
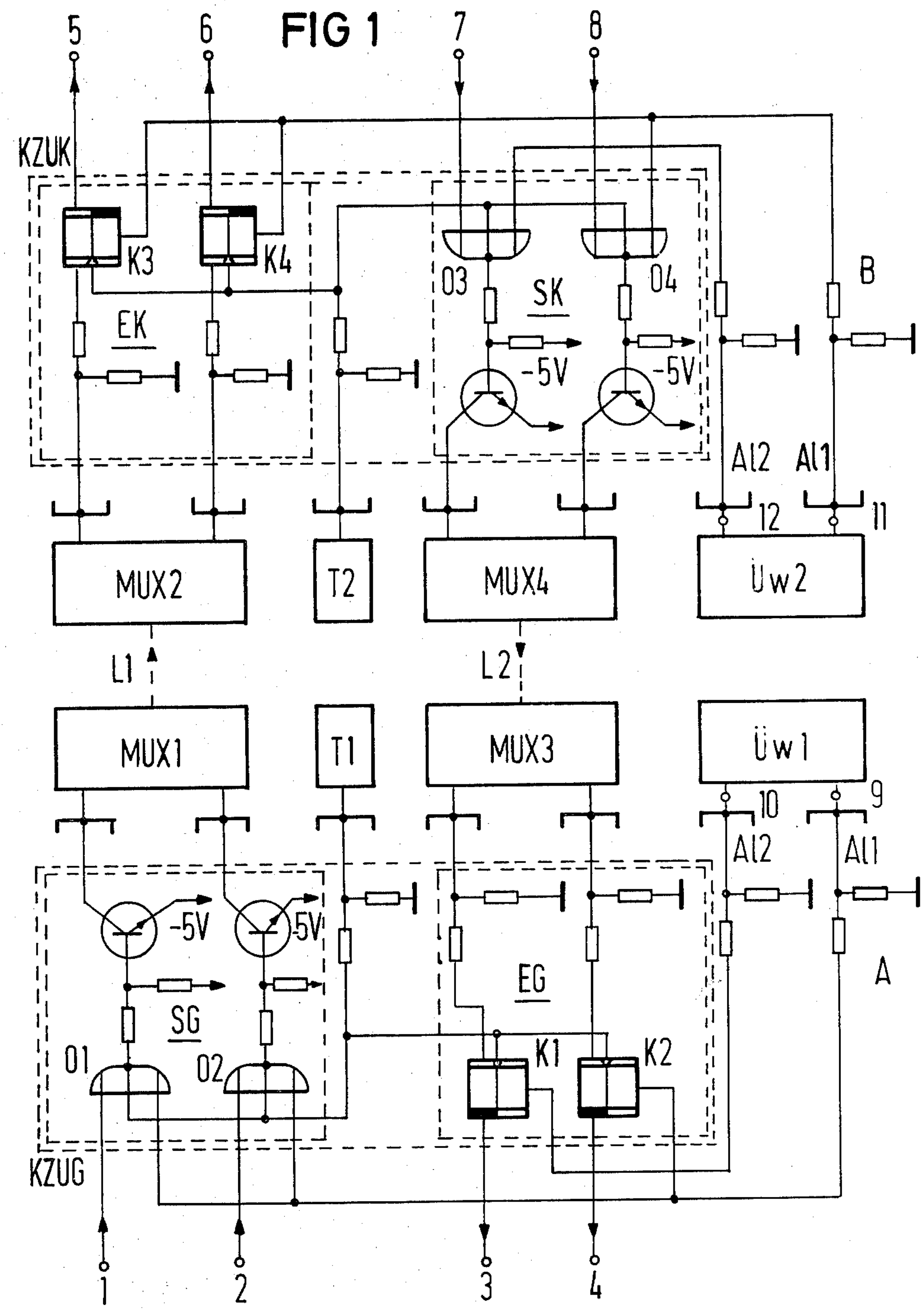
FIG. 1 is a schematic circuit diagram of a TDM multiplex system for PCM operation.

Referring to FIG. 1, a TDM system for PCM operation is illustrated having a pair of terminals A and B. The system contains multiplex devices MUX1 and MUX2, as well as a transmission path L1 for transmission in one direction and multiplex devices MUX3 and MUX4 as well as a transmission path L2 for transmission in the opposite direction. A clock supply T1 and a monitoring device Üw1 are provided in the terminal A. Accordingly, the terminal B contains a clock supply T2 and a monitoring device Üw2. The terminal A further contains an "outgoing" signaling converter KZUG having a transmitting portion SG and a receiving portion EG. Accordingly, the terminal B contains an "incoming" signaling converter KZUK having a transmitting portion SK and a receiving portion EK.

The multiplex devices are commercially available and, for example, are described in the Siemens AG brochure "Time Division Multiplex Systems, PCM 30 and PCM 120", Order No. S 422022-A709-A1-1-7629, particularly in the drawing on Page. 3. The elements MUX1–MUX4 correspond to the "Multiplex Unit" in the brochure without the channel units and without the monitoring devices.

The above-mentioned drawing illustrates the monitoring device (supervisory section) both in the "Multiplex Unit" as well as in the "SC Equipment". The monitoring device Üw1 and Üw2 according to the present invention respectively assume tasks of both known monitoring devices and are illustrated in detail in FIG. 2.

The transmission portions SG and SK respectively contain a plurality of subcircuits having a NOR gate and a transistor. However, only two respective circuits are illustrated which are connected by way of a bus line to the appertaining multiplex unit. The receiving portions EG and EK respectively contain a plurality of subcircuits having a flip-flop. Only two subcircuits are likewise illustrated here, being likewise connected by way of a bus line to the appertaining multiplex unit.

The monitoring circuits Üw1 and Üw2 respectively contain a signal output 9 or, respectively, 11 for an alarm signal A11 and an output 10 or, respectively, 12 for an alarm signal A12. Both alarm signals respectively appear on bus lines.

The connections 1 and 5 serve for seizure and release, the connections 2 and 6 are provided for dial pulses, the connections 3 and 7 serve for idle or blocking and the connections 4 and 8 are provided for begin and end of conversation characters.

Figure 2:
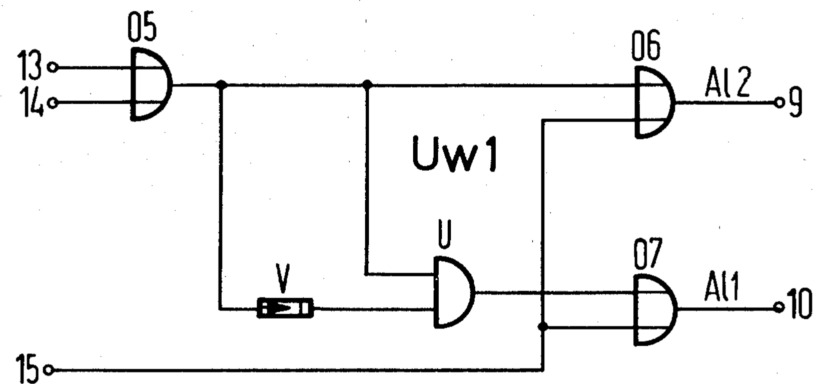
FIG. 2 is a schematic diagram of a monitoring device which may be employed in the system of FIG. 1.

The format, for example of the monitoring device Üw1, is illustrated in detail in FIG. 2. The device comprises OR gates 05–07 and AND gate U and a delay element V having a delay time of, for example, 1–2 seconds. Messages of disturbances such as loss of synchronization arrive at the input 13. Messages of faults from the appertaining multiplex units are applied to the input 14 and messages of faults from the central portion of the appertaining signaling converter are applied to the input 15. In accordance with the logic, the messages produce the potentially delayed first alarm signal A11 and the undelayed second alarm signal A12.

Given a signaling transmission by way of the TDM system, the forward signals in the terminal A traverse the transmission portion SG of the "outgoing" signaling converter KZUG and, in the terminal B, traverse the receiving portion EK of the "incoming" signaling converter KZUK. In the opposite direction, the backward signals in the terminal B traverse the transmitting portion SK in the "incoming" signaling converter KZUK and, in the terminal A, traverse the receiving portion EG of the "outgoing" signaling converter KZUG. Included among the forward signals, for example, are the seizure or, respectively, the release criterion as well as the dial information. Included among the backward signals, among others, are the criterion for idle or blocking, as well as the begin and end of conversation characters.

In the case of fault or disturbance, these criteria, partially undelayed, partially delayed, are to be brought into the state which corresponds to the binary value "1" in the appertaining signaling bit.

To this end, two separate alarm bus lines extend from the central monitoring devices Üw1 and Üw2 to the signaling converters. The first alarm signal A11 occurs immediately given faults in the system and occurs with delay given disturbances in the system in order to suppress the signaling transmission. The second alarm signal A12 occurs immediately both given disturbances and given faults in the system and prevents a new seizure of telephone channels. The receiving portions EG and EK as well as the transmitting portions SG and SK are differently controlled with the two alarm signals. The second, undelayed alarm signal A12 is fed to the receiving portion EG of the "outgoing" signaling converter or, respectively, to the transmitting portion SK of the "incoming" signaling converter by way of which the criterion for idle or blocking extends. The potentially delayed first alarm signal A11 is fed to the transmitting portion SG or, respectively, to the receiving portion EK by way of which the criterion for seizure and release extends and is also fed, either directly or via the seizure circuit, to the transmitting portion SG or, respectively, the receiving portion EK and to the receiving portion EG or, respectively, to the transmitting portion SK by way of which the further criteria for dial, begin and end of conversation extend.

In the operating case, both alarm lines carry voltage,so that signaling occurs uninhibited by way of all transmitting and receiving portions. In the fault case and in the disturbance case, ground potential appears on the alarm lines, the ground potential blocking the transmission portions and setting the receiving portions in which the information is intermediately stored into a defined, character-free state.

In the alarm case, the undelayed, second signal A12 always leads to the immediate blocking of the unseized telephone channels and, in particular, in the receiving portion EG, by means of setting the appertaining flip-flops from the idle condition (binary value "0") into the blocked condition, (binary value "1") or, respectively, in the "incoming" signaling converter by means of blocking the transmitting portion SK (binary value "1"), whereby the transmission of the idle condition to the other terminal A is suppressed.

With the potentially delayed first alarm signal A11, in contrast thereto, the criterion for the seizure and remaining characters are stopped, if need be, after a corresponding waiting time and, subsequent thereto, lead to a release and character-free state (binary value "1") in its own terminal as well as in the remote terminal.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a system for releasing and blocking telephone channels in signaling converters of a time division multiplex system for pulse code modulation in a terminal having at least one channel-specific outgoing signaling converter and a monitoring device with an alarm signal occurring immediately in response to faults and occurring with chronological differentiation in response to disturbances, the improvement therein comprising:

- a receiving portion of the outgoing signaling converter including at least one first flip-flop for begin and end of conversation characters having a setting input;
- a first alarm output of the monitoring device connected to said setting input;
- a transmitting portion including NOR gates for seizure/release and dialing connected to said output of the monitoring device;
- a second alarm output of the monitoring device for a second alarm signal; and
- at least one second flip-flop in said receiving portion for the idle/blocking condition including a setting input connected to said second alarm output.

2. In a system for releasing and blocking telephone channels in signaling converters of a time division multiplex system for pulse code modulation in a terminal having at least one channel-specific incoming signaling converter and a monitoring device with an alarm signal occurring immediately in response to faults and occurring with chronological differentiation in response to disturbances, the improvement therein comprising:

a receiving portion of the incoming signaling converter including flip-flops for seizure/release and dialing having setting inputs;

a first alarm output of the monitoring device connected to said setting inputs;

a transmitting portion including at least one first NOR gate for begin and end of conversation characters connected to said output of the monitoring device;

a second alarm output of the monitoring device for a second alarm signal; and at least one second NOR gate in said transmitting portion for the idle/blocking condition connected to said second alarm output.

* * * * *